United States Patent
Sakuma

[11] Patent Number: 5,133,102
[45] Date of Patent: Jul. 28, 1992

[54] ELECTRONIC TOOTHBRUSH
[75] Inventor: Shuji Sakuma, Tokyo, Japan
[73] Assignee: Kabushiki Kaisha Sangi
[21] Appl. No.: 751,583
[22] Filed: Aug. 22, 1991

Related U.S. Application Data
[63] Continuation of Ser. No. 470,696, Jan. 26, 1990, abandoned.

Foreign Application Priority Data
Jan. 31, 1989 [JP] Japan ................. 1-21168

[51] Int. Cl.⁵ ................................. A46B 9/04
[52] U.S. Cl. .................... 15/167.1; 15/176.6; 128/24.5; 128/393; 604/20
[58] Field of Search ........... 15/22.1, 105, 159 A, 15/167.1, 167.2, 176.1, 176.6; 128/24.1, 24.5, 393; 132/311; 433/141, 216; 604/20

[56] References Cited
U.S. PATENT DOCUMENTS

| | | | |
|---|---|---|---|
| 407,115 | 7/1889 | Pratt | 15/167.1 |
| 1,948,990 | 2/1934 | Mitlehner | 128/393 |
| 2,834,344 | 5/1958 | Kanai | 15/167.1 |
| 3,478,741 | 11/1969 | Simor | 15/167.1 |
| 3,533,119 | 10/1970 | Dokos | 15/22.1 |
| 4,476,604 | 10/1984 | White et al. | 15/105 |
| 4,665,921 | 5/1987 | Teranishi et al. | 604/20 |
| 4,691,718 | 9/1987 | Sakuma et al. | 15/167.1 |
| 4,726,806 | 2/1988 | Hakuba | 15/167.1 |
| 4,744,124 | 5/1988 | Wang et al. | 15/105 |
| 4,788,734 | 12/1988 | Bauer | 15/105 |
| 4,944,296 | 7/1990 | Suyama | 15/167.1 |

FOREIGN PATENT DOCUMENTS

| | | | |
|---|---|---|---|
| 517958 | 3/1955 | Italy | 15/105 |
| 406137 | 8/1966 | Switzerland | 604/20 |
| 405601 | 5/1932 | United Kingdom | 128/393 |
| 390985 | 4/1933 | United Kingdom | 128/393 |

*Primary Examiner*—Harvey C. Hornsby
*Assistant Examiner*—Mark Spisich
*Attorney, Agent, or Firm*—Finnegan, Henderson, Farabow, Garrett & Dunner

[57] ABSTRACT

An electronic toothbrush has a handle accommodating a light-emitting diode and a sound-producing device as well as an electric circuit for actuating the diode and device. When a current is caused to flow through the toothbrush by grasping the brush and bringing it into contact with the teeth, light and sound are emitted to notify the user that the toothbrush is operating.

1 Claim, 8 Drawing Sheets

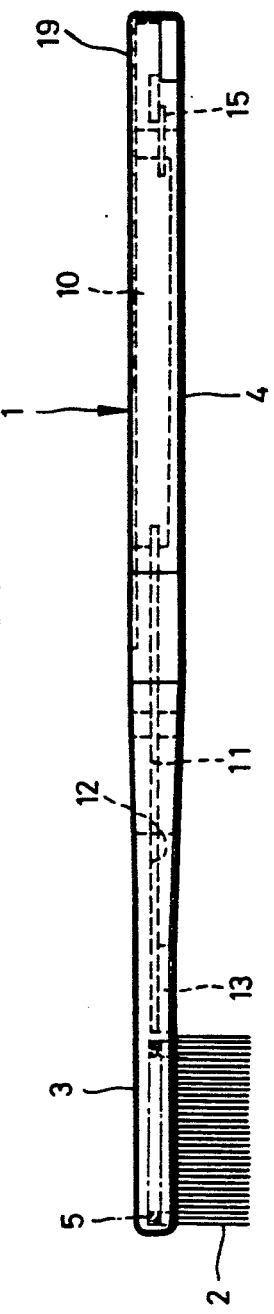
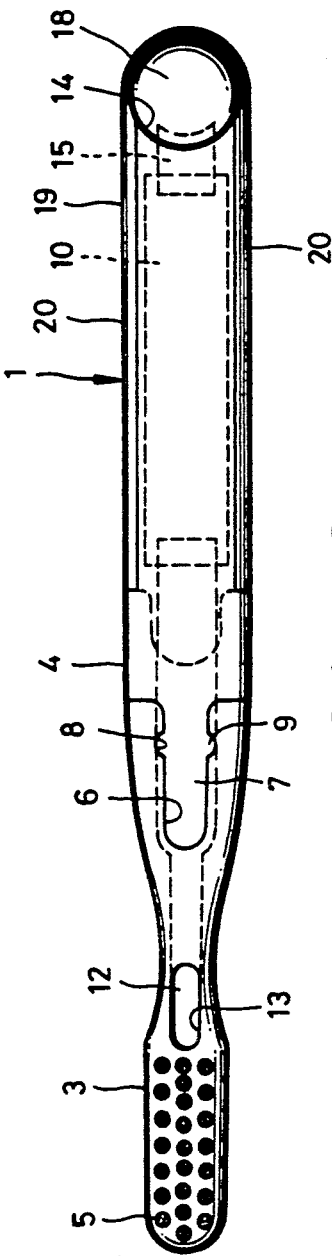
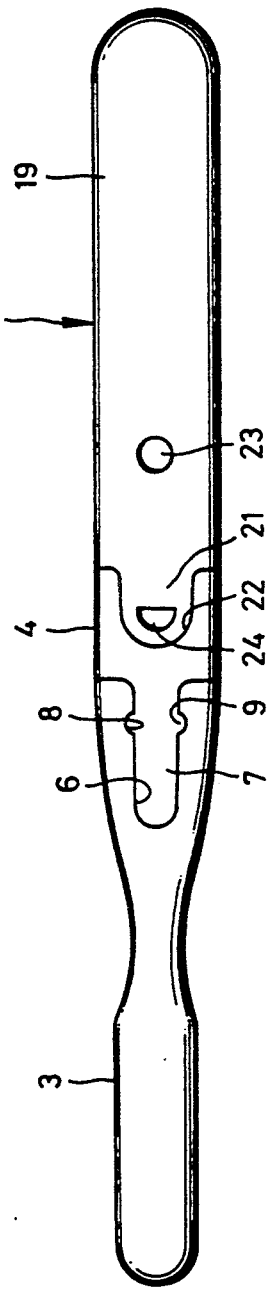

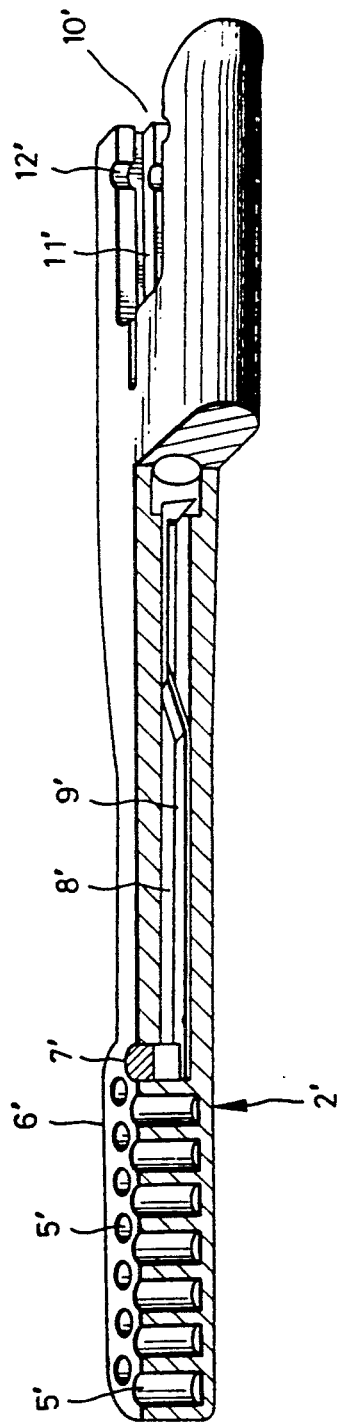
FIG. 9
FIG. 10

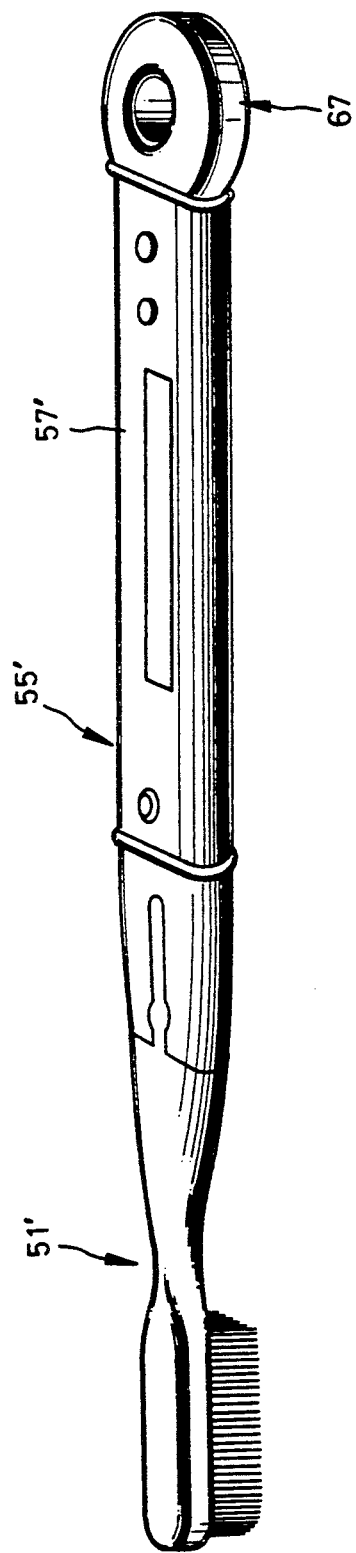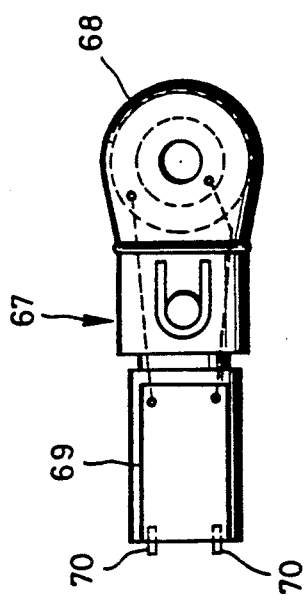
FIG. 14
FIG. 15

ELECTRONIC TOOTHBRUSH

This application is a continuation of application Ser. No. 07/470,696, filed Jan. 26, 1990, abandoned.

BACKGROUND OF THE INVENTION

This invention relates to an electronic toothbrush.

An electronic toothbrush well-known in the art includes a bristle portion and a handle the interior of which accommodates a battery, one electrode of which is connected to the bristle portion by a conductor. A conductor connected to the other electrode of the battery is secured to the surface of the handle. By grasping this conductor with the hand and bringing the bristles of the toothbrush into contact with the teeth, a current is caused to flow from the hand to the surface of the teeth through the human body.

When the handle of this conventional electronic toothbrush is grasped by the hand, approximately 50 to 100 $\mu$A of current is produced and causes a positive current to flow through the human body. This in turn causes positive charges to accumulate on the high-protein plaque on the teeth. As a result, the positive current flowing through the teeth repulses the positive charges on the plaque, so that the plaque readily separates from the teeth and is attracted to the negative bristles of the toothbrush.

A problem with this conventional electronic toothbrush, however, is that the user can never be certain as to whether the current is truly flowing when the toothbrush is being used. The user therefore cannot be confident that the toothbrush is operating properly. Moreover, verifying that the current is flowing is a troublesome task.

SUMMARY OF THE INVENTION

An object of the present invention is to provide an electronic toothbrush which enables the user to easily verify that the current is flowing, thereby solving the aforementioned problems encountered in the prior art.

According to the present invention, the foregoing object is attained by providing an electronic toothbrush comprising a bristle portion having a number of bristles implanted therein, a handle portion for being detachably attached to the bristle portion, a battery provided inside the handle and having first and second electrodes, a first conductor provided inside the handle for connecting the first electrode of the battery to the bristle portion, a second conductor fixed to a surface of the handle and connected to the second electrode of the battery, a light-emitting diode and/or a sound producing device provided inside the handle and connected across the first conductor and the battery for emitting light when activated, and an electric circuit provided inside the handle for activating the light-emitting diode when a current flows from the first to the second electrode of the battery through the first conductor, the bristle portion, a body of an individual using the toothbrush, the handle and the second conductor.

In operation, the second conductor constituting the handle is grasped by the user's hand and the bristles of the toothbrush are brought into contact with the teeth. This causes a minute electric current to flow through the toothbrush, thereby producing light and/or sound which can be readily perceived by the user from outside the handle.

In accordance with the present invention, an electronic toothbrush has a simple structure provided with a light-emitting diode and/or sound-producing device which enables a user to verify, by light from the light-emitting diode and/or sound from the sound-producing device, whether the toothbrush is carrying an electric current or not. This enables the user to employ the electronic toothbrush while being confident of the fact that the toothbrush is carrying the electric current as planned.

Other objects of the present invention will become clear from the description and claims based on the accompanying drawings.

BRIEF DESCRIPTION OF THE DRAWINGS

FIG. 1 is a side view illustrating an embodiment of an electronic toothbrush according to the present invention;

FIG. 2 is a bottom view of the toothbrush;

FIG. 3 is a plan view of the toothbrush;

FIG. 9 is a partial cross-section of a bristle portion of the second embodiment;

FIG. 10 is a view showing an electrical conductor;

FIG. 14 is a perspective view showing a fourth embodiment of the present invention.

FIG. 15 is a detailed view of a portion of the embodiment of FIG. 14.

DESCRIPTION OF THE PREFERRED EMBODIMENT

Figure 4:
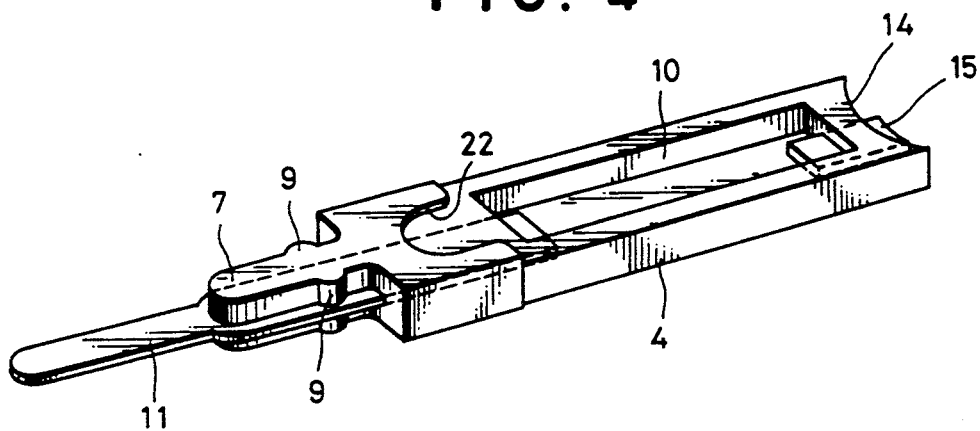
FIG. 4 is a perspective view showing a handle of the toothbrush.

A preferred first embodiment of an electronic toothbrush according to the invention will now be described in detail with reference to the drawings.

With reference first to FIGS. 1 through 3, there is shown an electronic toothbrush 1 which includes a bristle portion 3 in which bristles 2 are implanted, and a handle 4 fitted detachably into the bristle portion 3 to hold the same.

Preferably, the bristle portion 3 comprises a molded body consisting of the synthetic resin or a combination of the synthetic resin and an apatite-ceramic such as hydroxy apatite $[Ca_{10}(PO_4)_6(OH)_2]$ or apatite fluoride $[Ca_{10}(PO_4)_6F_2]$. The molded body of apatite-ceramic is a mixture which includes ordinary synthetic resin (plastic) and 70-90 wt. % of hydroxy apatite or apatite fluoride and is obtained by applying about 500-700 kg/cm$^2$ of pressure to the mixture at room temperature to mold the same.

The bristle portion 3 has a number of holes 5 in which bristles 2 are implanted. The holes 5 may be filled with hydroxy apatite or an anti-fungus agent, before which the bristles 2 can be implanted.

The handle 4, which comprises a synthetic resin or an ion-eluting ceramic, is formed to have a longitudinally extending projection 7 capable of being fitted into a recess 6 formed in the bristle portion 3.

The recess 6 is formed to have an engaging groove 8, and the projection 7 is formed to have an engaging protuberance 9 which mates with the groove 8, thereby preventing the handle 4 from readily detaching from the bristle portion 3.

As shown in FIG. 4, the handle 4 is formed to include a recess 10 for receiving an electric circuit, the recess being open to one side of the handle 4. A plate-shaped first conductor 11 is fixedly inserted into the projection 7 of the handle 4. One end of the first conductor 11 projects into the recess 10, and its other end protrudes from the projection 7. When the protruding end portion of the first conductor 11 is inserted into the bristle portion 3, it fits into a slit 12 formed in the bristle portion.

A hole 13 is formed in the bristle portion 3 in the side thereof having the implanted bristles 2. The distal end portion of the first conductor 11 fitted into the slit 12 is exposed at the hole 13 to improve conductivity. Though the hole 13 has the form of an elongated slot in the illustrated embodiment, it can be formed as a plurality of apertures if desired.

The end of the handle 4 opposite the projection 7 is formed to include a cavity 14 for loading a battery cassette including the battery 18. A second conductor plate 15 is fixed in the handle 4 in such a manner that one end thereof projects into the battery loading cavity 14 while the other end projects into the circuit accommodating recess 10.

Figure 7:
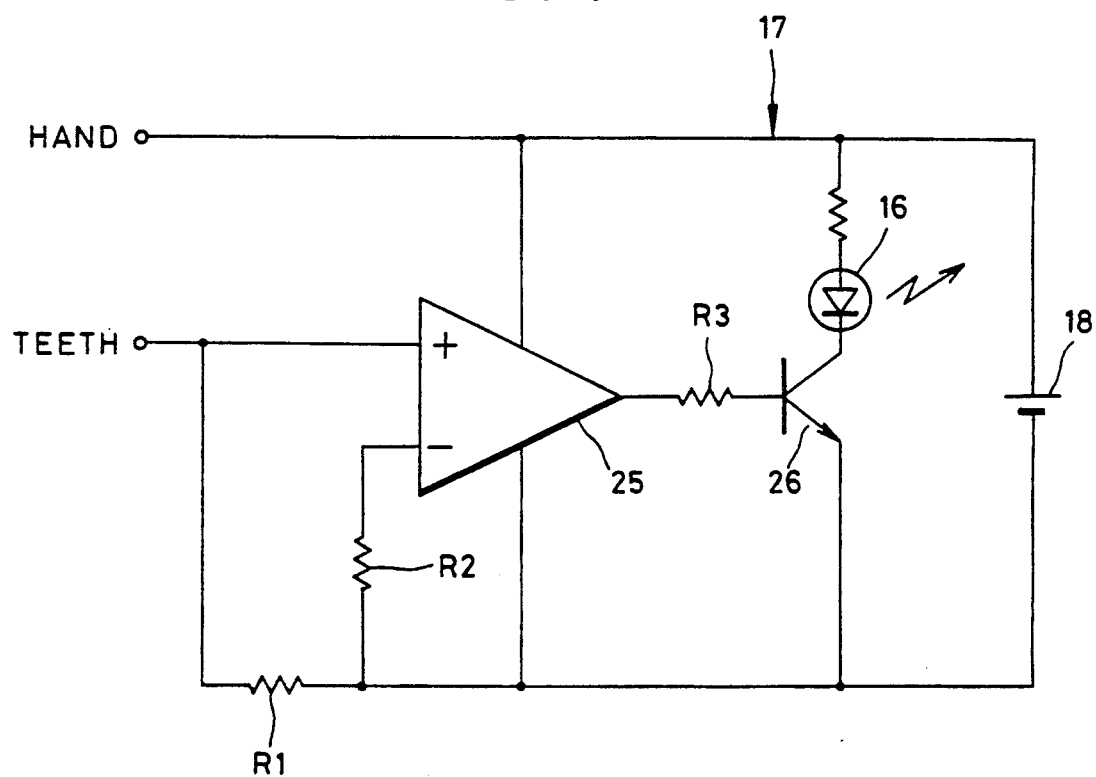
FIG. 7 is a circuit diagram of an electric circuit accommodated within the handle of the toothbrush.

An electric circuit 17 of the kind shown, for example, in FIG. 7 is formed on a circuit board, to which a light-emitting diode 16 is affixed in accordance with this embodiment. The circuit board having this circuit is accommodated in the recess 10. It should be noted that a sound-producing device instead of the light-emitting diode 16 can be affixed to the circuit board, in which case the electric circuit would be designed to actuate the sound-producing device.

Figure 5:
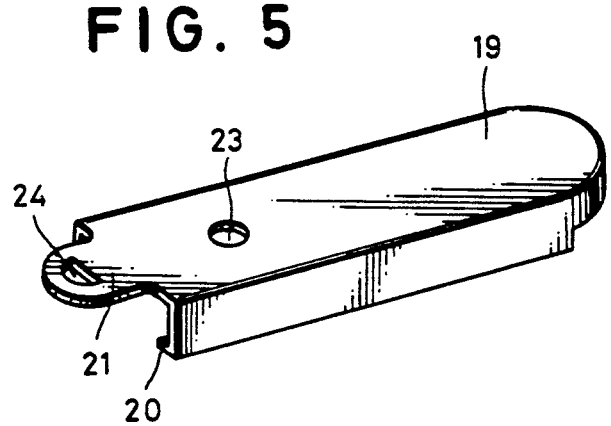
FIG. 5 is a perspective view showing a cover of the toothbrush.

After the battery cassette including the battery 18 is loaded in the handle 4 accommodating the circuit board, a cover 19 consisting of an electrically conductive material and formed to serve as a second conductor is secured to the handle, thereby preventing the circuit board and battery 18 from falling out. As shown in FIG. 5, the cover 19 is formed to have a generally C-shaped cross section and includes longitudinally extending side edges provided with longitudinal projections 20 so as to embrace the handle 4. The cover 19 is formed so that it can be fixedly fitted onto the handle 4 from the end thereof accommodating the battery 18. The cover 19 further has a tongue 21 fitted into a groove 22 provided in the handle 4, and is formed to include a hole 23 positioned so that light emitted by the light-emitting diode 16 on the circuit board accommodated in the recess 10 can be seen from the outside. The tongue 21 is formed to have a hole 24 with which a fingernail is engaged when detaching the cover 19.

Figure 6:
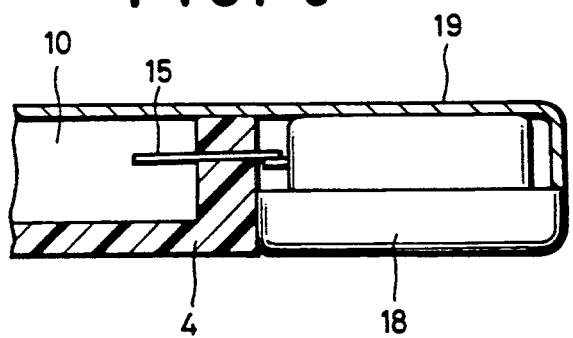
FIG. 6 is a partial sectional view showing the handle of the toothbrush as it appears when the cover is fitted in place.

As shown in FIG. 6, the loaded battery 18 has a first (e.g., negative) electrode connected to the conductor plate 15, and a second (e.g., positive) electrode connected to the cover 19, which consists of the electrically conductive material. The battery 18 is retained in the handle 4 so as not to fall out, though the retaining means is not shown.

When the electronic toothbrush is used, the hand of the user contacts the cover 19 in grasping the handle 4, and the bristles 2 are brought into contact with the teeth. As a result, a terminal on the hand side of the circuit shown in FIG. 7 and a terminal on the tooth side are electrically closed, so that a current which passes through the user's hand and body flows into the surface of the teeth via the dental pulp tissue and tooth tissue proper. Calcium fluoride ions which elute out of the ion-eluting ceramic of the bristle portion 3 collect on and permeate the teeth and tooth pulp. The flow of electric current causes the protein organic ions of plaque on the surfaces of the teeth to become affixed to the toothbrush 1, so that the plaque separates from the tooth surfaces.

When the electric current passes through the interior of the toothbrush 1, a trigger voltage is applied to the base of a transistor 26 (FIG. 7) by an amplifier circuit which includes resistors R1, R2 and an amplifier 25. The trigger voltage causes the transistor 26 to turn on, thereby activating the light-emitting diode 16, which emits light as a result. The light from the light-emitting diode 16 can readily been seen from the outside through the hole 16.

A preferred second embodiment of the present invention will be described with reference to FIGS. 8-12 wherein an electronic toothbrush 1' includes a bristle portion 2', handle portion 3' detachable thereto and a battery cassette 4' detachably secured to the handle portion 3'. The head 6' of bristle portion 2' has a number of holes 5' in which bristles are implanted. A plug 7' of electrical conductive material is fitted into a hole near one of the holes 5'. The bristle portion 2' is provided with a longitudinally elongating central hole 8' so that a part of the plug 7' will extend into the central hole 8', which has a plate 9' of electrical conductive material therein. The plate 9' is formed with at least one step portion and opposed surfaces thereof may be resiliently abutted on opposed walls of the hole 8' so as not to slip out from the central hole 8'. The central hole 8' is open to a groove 10' wherein recesses 11', 12' are formed. The plate 9' provided at its one end with a flat wall 12".

The handle portion 3' has a recess 13' being open to upper side thereof wherein an electrical circuit 14', a first and second terminal 15', 16' are accommodated. A light-emitting diode and/or a sound producing device are affixed to a circuit board on which the electrical circuit is formed and negative terminal 19' and positive terminal 20' are affixed. A vertical leg 21' of the first terminal 15' is inserted into a slit 22' formed on the recess 13' and a vertical leg 23' of the first terminal 15' is electrically connected to a positive electrode of a battery 24' so that the terminal 15' can be into contact with the positive terminal 17' of the electrical circuit 14'. The vertical leg 25' of the second terminal 16' is inserted into a slit 26' of the handle portion 3' and a segment 27 is brought into electrical contact with the negative electrode of the battery 24'. The terminal 16' is abutted on the negative terminal 19' of the electrical circuit 14'.

To close the top-opening of the recess 13', a silicone seal 28 and an electrically conductive cover 29 are secured to the handle portion 3'. The cover 29 includes opposed walls which are snap-fitted to the opposed outer surfaces of the handle portion 3'. The projection 30' of the handle portion 3' is press-fitted into a slit 30 of the cover 29.

The negative terminal 18' of the electrical circuit 14' is connected through a spring 31 to the cover 29 to make the negative side cover 29.

The seal 28 and the cover 29 are formed to include holes 32, 33 so positioned that light and/or sound emitted by diode and/or device 45, 46, 49, 50.

The handle portion 3' is provided at its front portion with a hollow projection 34 in which a stainless steel shaft 35 is inserted. The rear end of the shaft 35, comes into contact with the positive terminal 20'. The handle portion 3' is provided with engaging protuberances 36, 37 which mate with the grooves or slits 11, 12' of the bristle portion 2'.

When the bristle portion 2' is attached to the handle portion 3', the shaft 35 is inserted into the hole 8' and the front portion of the handle portion 3' is also inserted into the groove 10' of the bristle portion 2' so that the protuberances 36, 37 are snap-fitted into the slits 11', 12', thereby firmly securing the handle portion 3' to the bristle portion 2' When the bristle portion 2' is to be replaced with a new one, the bristle portion 2' is drawn in the direction apart from the handle portion 3' so as to easily separate each other.

The battery cassette 4' is provided at its front part with a T-shape recess 38 and a stepped portion for disposing O ring 39. The cassette 4' includes a stopper 40 and a tray 41 of electrically insulating material having a T-shaped part 42 which is placed in the recess 38. The front portion 43 of the cassette 4' can be inserted into the rear opening of the handle portion 3' so that the positive electrode of the battery 24' is brought into electrical contact with the leg 23' and the negative electrode thereof is in electrical contact with the leg 25'. The stopper 40 is engaged with a hole 44 of the negative cover 29 so as to prevent the cassette 4' from slipping out of the handle portion 3'

Figure 11:
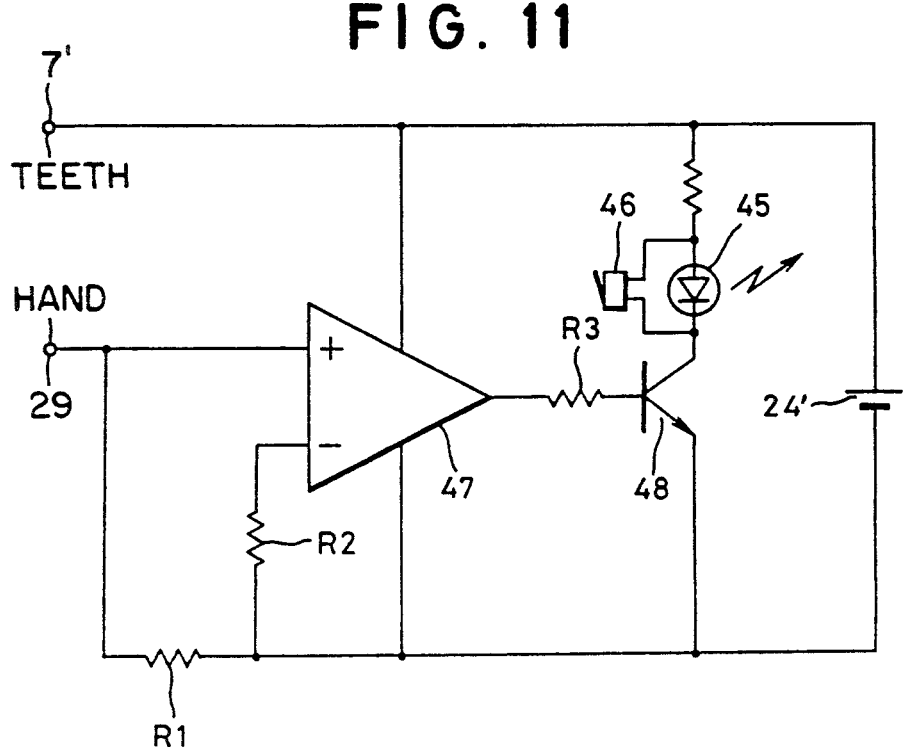
FIGS. 11 and 12 are circuit diagrams used in the present invention, respectively.
Figure 12:
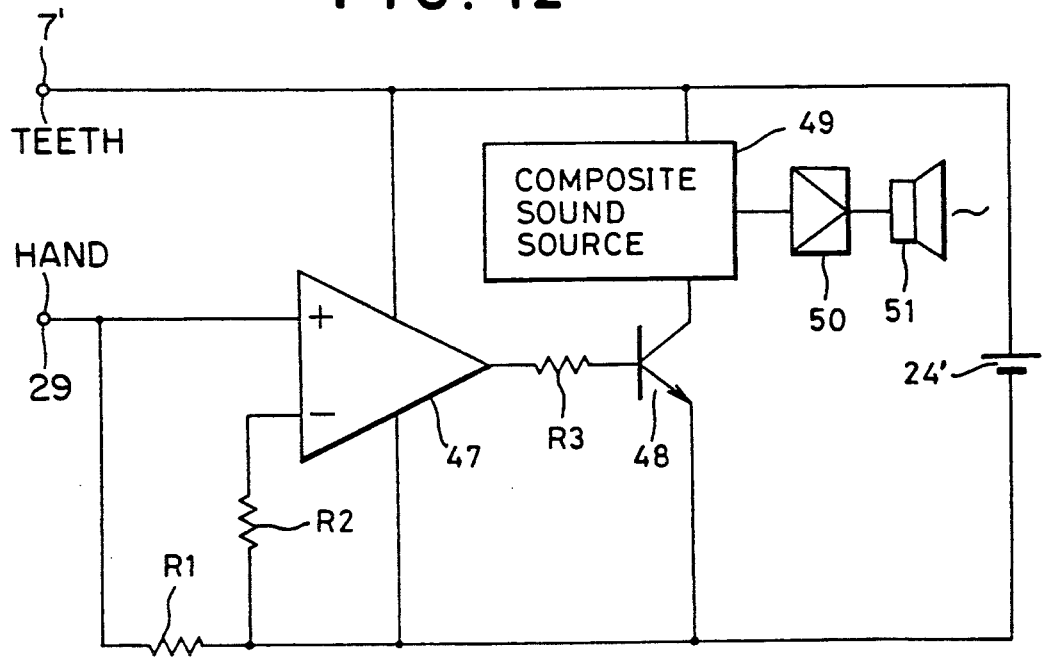

The electric circuits 14', for example, in FIGS. 11 and 12 are formed on each circuit board, respectively to which a light emitting diode 45, a buzzer 46, a composite sound source 49 for storing the desired music or voice, an amplifier 50 or a speaker 51 together with resistors R1, R2, R3, an amplifier 47 and a transistor 48 are affixed.

When the electronic toothbrush is used, the hand of the user contacts the cover 29 in grasping the handle 4', and the bristles 2' are brought into contact with the teeth. As a result, a terminal 29 on the hand side of the circuit shown in FIGS. 11 and 12 and a terminal 7' on the tooth side are electrically closed, so that a current which passes through the user's hand and body flows into the surface of the teeth via the dental pulp tissue and tooth tissue proper. The flow of electric current causes the protein organic ions of plaque on the surfaces of the teeth to become affixed to the toothbrush 1'. so that the plaque separates from the tooth surfaces.

When the electric current passes through the interior of the tooth brush 1' a trigger voltage is applied to the base of a transistor 48 (FIG. 11 or 12) by an amplifier circuit which includes resistors R1, R2, R3 and an amplifier 47. The trigger voltage causes the transistor 48 to turn on, thereby activating the light-emitting diode 45, the buzzer 46 or the sound source 49, which emits signal as a result. The signal from the such the device can readily been recognized from the outside through the hole 33 or ear.

Figure 8:
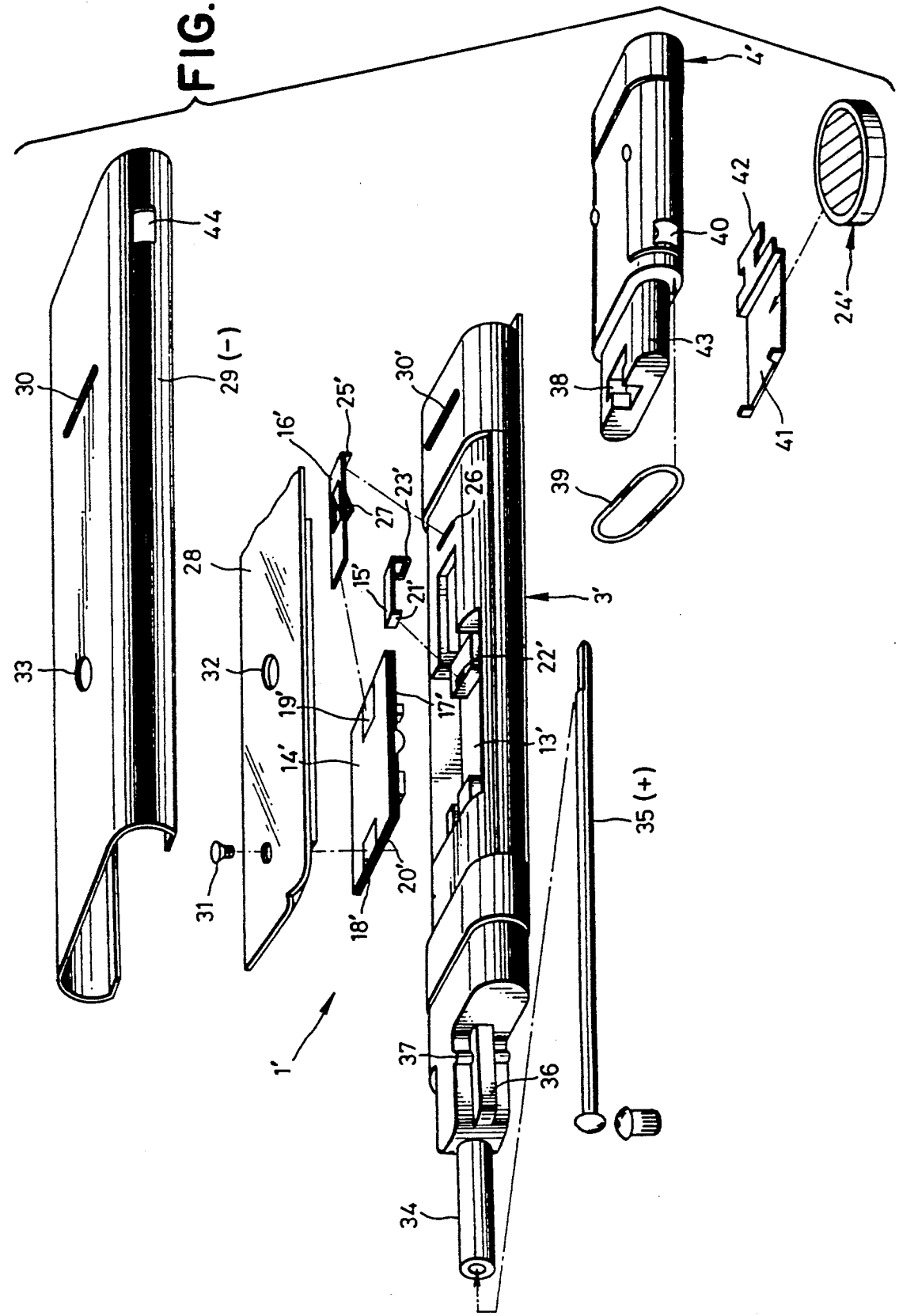
FIG. 8 is a perspective view showing a handle portion of a second embodiment of the present invention.
Figure 13:
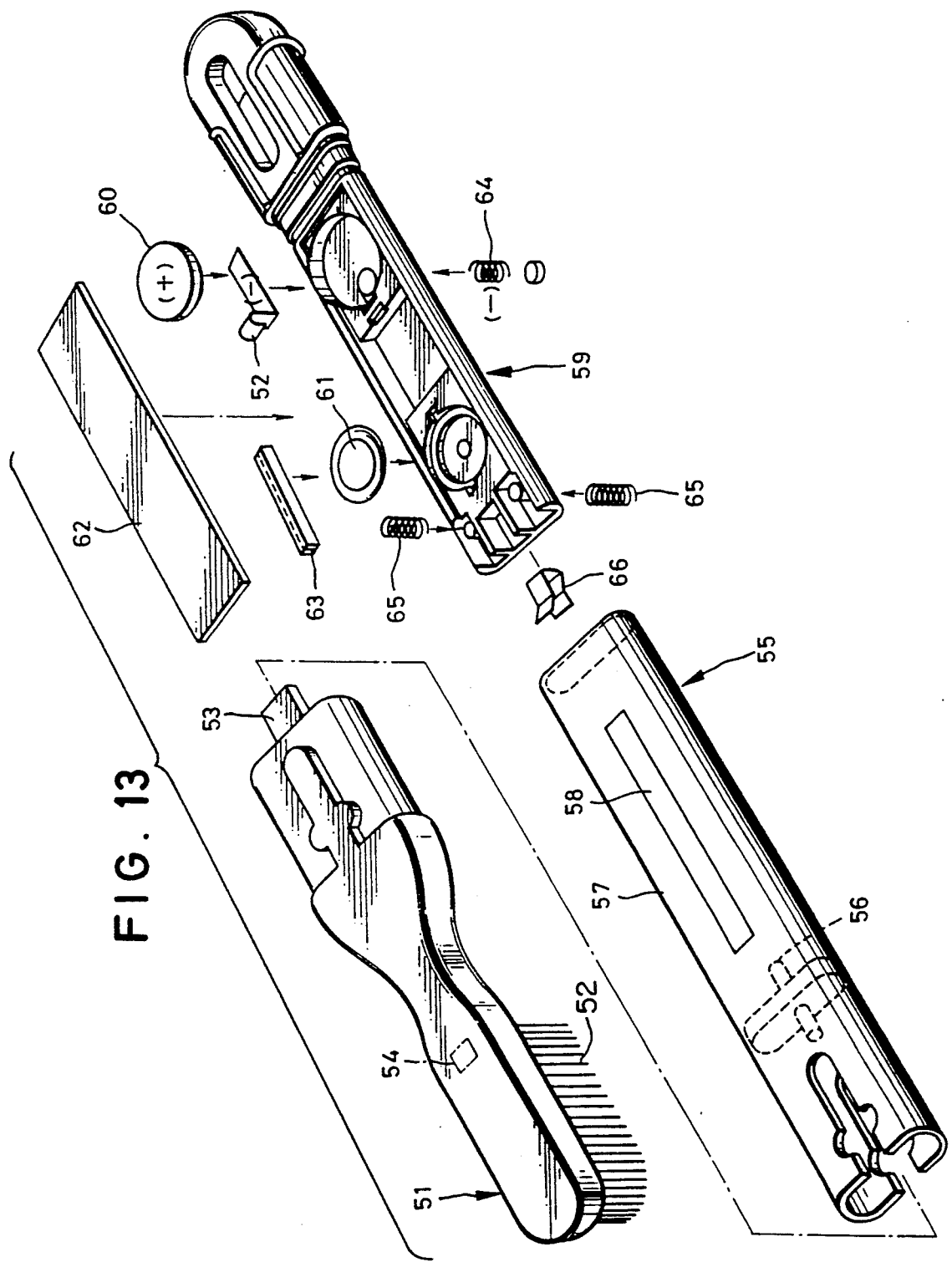
FIG. 13 is a perspective view showing a third embodiment of the present invention.

An embodiment illustrated in FIG. 13 relates to an improvement of toothbrush in FIG. 8. A bristle portion 51 has bristles 52 implanted therein. An electrically conductive conductor 53 is inserted into a longitudinal hole formed in the bristle portion 51 and extends outwardly of one end thereof. The other end of the conductor 53 in the bristle portion 51 leads to the outside through an electrically conductive plug 54. A handle 55 is fitted detachably into the bristle portion 51 so that the end portion of the conductor 53 is brought into electrical contact with a terminal 56 as supported in a hollow main body 57 made of a synthetic resin but has electrically conductive plates 58 embedded on outer surfaces of the main body 57. A cassette 59 is inserted into the interior of the hollow main body 57 wherein a battery 60, a buzzer 61, a circuit board 62 having a circuit of FIG. 11 or 12. The parts 63–66 are assembled in each cavity of the cassette 59 so as to electrically connect each components to emit a light and/or produce a sound. The negative part of the circuit board 62 comes into electrical contact with the plate 58 when the cassette 59 is inserted into the main body 55. After insertion of the cassette 59 into the main body 55, both the members are bonded each other so that the sealing effect to protect electrical components from water is increased.

When the electronic toothbrush in FIG. 13 is used, the hand of the user contacts the plates 58 in grasping the handle portion 55 and the bristles 52 are brought into contact with the teeth as well as the afore-mentioned embodiment. As a result, the terminal 58 on the hand side and the terminal 54 on the tooth side are electrically closed to pass a current through the user's body and separate plaque from the tooth surfaces.

When a music or voice from the sound producing device or source is desired to be replaced, an embodiment illustrated in FIGS. 14 and 15 is preferred wherein a cassette 67 is detachably attached to a main body 57' of the handle portion 55'. The cassette 67 includes a buzzer 68 and a melody board 69 which is put on a market. The user will have different cassettes 67 including different melody boards 69 and use a desired one of them. One end of the cassette 67 are provided with a pair of electrical terminals 70 which is brought into electrical contact with terminals on the circuit board like the circuit board 62 in FIG. 13 and for the circuit diagram of FIG. 12 when the cassette 67 is inserted into the main body 57' of the handle portion 55'.

The present invention is not limited to the foregoing embodiments but can be modified in various ways based on the gist thereof without departing from the scope of the claims.

What is claimed is:

1. An electronic toothbrush comprising:
   a bristle portion having a number of bristles implanted therein;
   a battery provided inside said handle portion and having first and second electrode;
   a first conductor provided inside said handle and connecting the first electrode of said battery to said bristle portion;
   a second conductor fixed to an outer surface of said handle portion and connected to the second electrode of said battery;
   an indicator means provided inside said handle portion for emitting light and sound;
   an electric circuit provided inside said handle and connected to each of said conductors for activating said indicator means to produce sound and light to a user of the toothbrush when a hand of the user contacts said second conductor and said bristles contact the teeth of the user and to enable an electric current to flow from the first to the second electrode of said battery, said indicating means serving to indicate the flow of electric current in said electric circuit;

said electric circuit including (1) a transistor connected through the indicator means to the first electrode and also connected to the second electrode and (2) an amplifier circuit comprising first and second resistor means and an amplifier, the amplifier being connected through the first resistor means to the transistor and through the second resistor means to the second conductor and the second electrode;

a battery cassette detachably attached to said handle portion, wherein said battery is accommodated, the first electrode of said battery being electrically connected through said electric circuit to said first conductor, whereby when said toothbrush is used electric current passes through the users hand and body via the dental tissue to the tooth surfaces so as to cause protein organic ions thereon to become affixed to the toothbrush.

* * * * *

UNITED STATES PATENT AND TRADEMARK OFFICE
CERTIFICATE OF CORRECTION

PATENT NO. : 5,133,102

DATED : July 28, 1992

INVENTOR(S) : Shuji Sakuma

It is certified that error appears in the above-identified patent and that said Letters Patent is hereby corrected as shown below:

Title page, Assignee, after "Kabushiki Kaisha Sangi" insert --Tokyo, Japan--.

Claim 1, column 6, between lines 52 and 53, insert --a handle portion detachably attached to said bristle portion;--.

Claim 1, column 6, line 54, change "electrode" to --electrodes--.

Signed and Sealed this

Thirty-first Day of August, 1993

*Attest:*

BRUCE LEHMAN

*Attesting Officer*       *Commissioner of Patents and Trademarks*